US012666336B2

(12) United States Patent　(10) Patent No.: US 12,666,336 B2
Tsai　(45) Date of Patent: Jun. 23, 2026

(54) METHOD AND APPARATUS FOR ENSURING SECURE TRANSMISSION IN MOBILE COMMUNICATIONS

(71) Applicant: MediaTek Inc., Hsinchu City (TW)

(72) Inventor: Chun-Fan Tsai, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 346 days.

(21) Appl. No.: 18/371,729

(22) Filed: Sep. 22, 2023

(65) Prior Publication Data

US 2024/0114419 A1　Apr. 4, 2024

Related U.S. Application Data

(60) Provisional application No. 63/377,553, filed on Sep. 29, 2022.

(51) Int. Cl.
| *H04W 36/36* | (2009.01) |
| *H04W 12/041* | (2021.01) |
| *H04W 76/20* | (2018.01) |

(52) U.S. Cl.
CPC ....... *H04W 36/362* (2023.05); *H04W 12/041* (2021.01); *H04W 76/20* (2018.02)

(58) Field of Classification Search
CPC .. H04W 12/041; H04W 36/362; H04W 76/20
See application file for complete search history.

(56) References Cited

U.S. PATENT DOCUMENTS

| 2022/0279407 | A1* | 9/2022 | Uchino | ............. | H04W 36/0061 |
| 2022/0386195 | A1* | 12/2022 | Ishii | ................. | H04W 36/0069 |

| 2022/0394584 | A1* | 12/2022 | Ishii | ...................... | H04W 76/19 |
| 2022/0408323 | A1* | 12/2022 | Ishii | ................. | H04W 36/0055 |
| 2024/0114400 | A1* | 4/2024 | Yu | ........................... | H04W 88/04 |
| 2024/0114421 | A1* | 4/2024 | Purkayastha | ......... | H04W 36/36 |
| 2024/0340751 | A1* | 10/2024 | Jin | ....................... | H04W 36/362 |
| 2025/0039783 | A1* | 1/2025 | Liang | .................... | H04W 48/16 |
| 2025/0081182 | A1* | 3/2025 | Pan | .................. | H04W 28/0268 |
| 2025/0106702 | A1* | 3/2025 | Liu | ................. | H04W 36/00835 |
| 2025/0142425 | A1* | 5/2025 | Wang | .................... | H04W 12/04 |
| 2025/0168725 | A1* | 5/2025 | Kim | ................. | H04W 36/0069 |
| 2025/0193747 | A1* | 6/2025 | Park | .................. | H04W 56/0015 |
| 2025/0294417 | A1* | 9/2025 | Abdul Latheef | . | H04W 36/0072 |

* cited by examiner

*Primary Examiner* — Melanie Jagannathan

(74) *Attorney, Agent, or Firm* — Andy M. Han; Han IP PLLC

(57)　ABSTRACT

Examples pertaining to secure transmission in mobile communications are described. A UE receives an RRC reconfiguration message from a master network node. The RRC reconfiguration message comprises information regarding candidate cells and predefined reconfigurations, and each candidate cell is associated with one predefined reconfiguration. The UE evaluates a triggering condition for at least one candidate cell to determine whether to trigger a conditional cell change procedure and performs the conditional cell change procedure to switch a PSCell associated with the apparatus to a target cell in an event that the triggering condition for the target cell is met. The UE derives a security key according to a counter value and a key of the master network node. The counter value is obtained from a sequence of distinct counter values of the target cell or of a target secondary node stored by the processor or is generated by the processor.

16 Claims, 4 Drawing Sheets

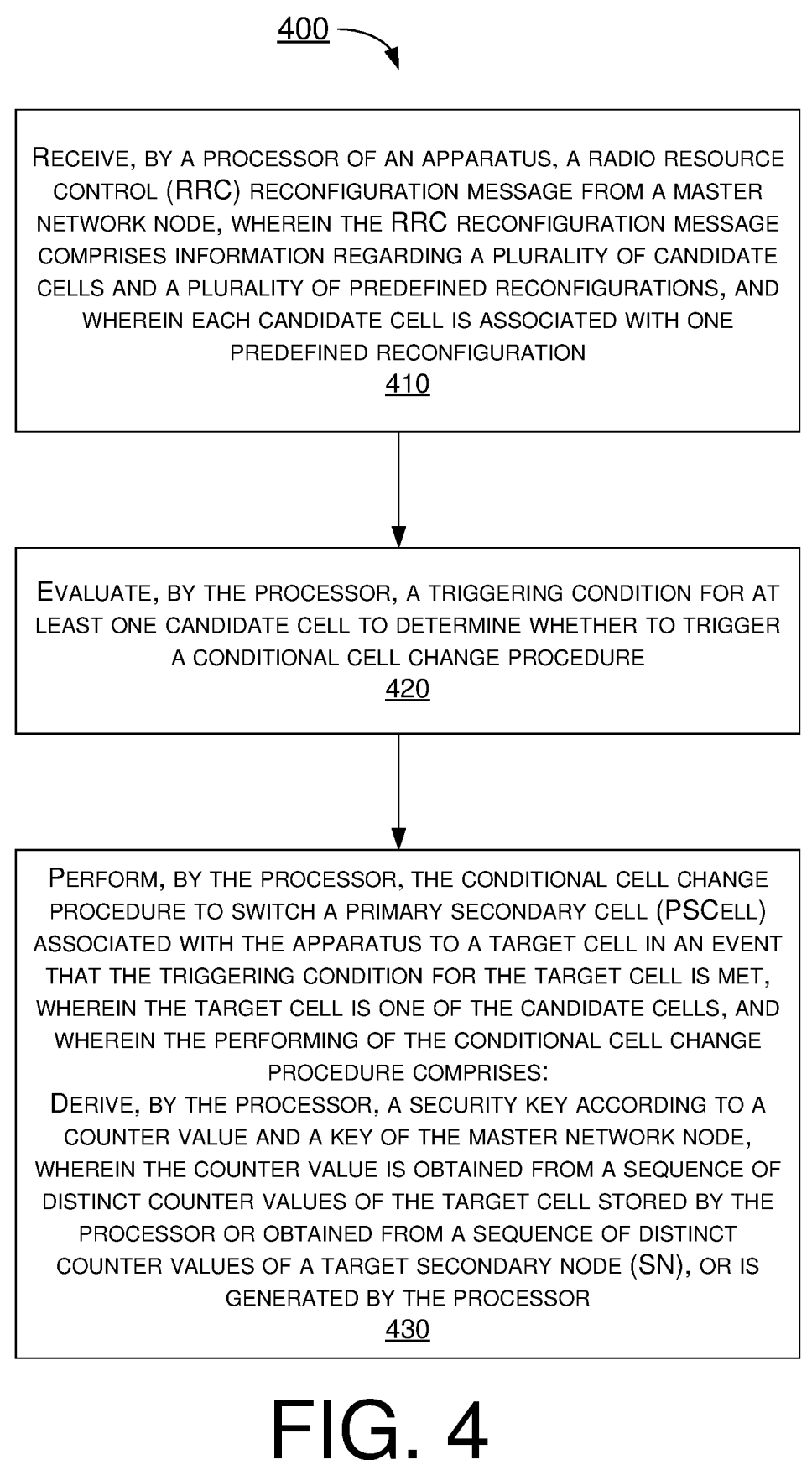

400 ⟍

RECEIVE, BY A PROCESSOR OF AN APPARATUS, A RADIO RESOURCE CONTROL (RRC) RECONFIGURATION MESSAGE FROM A MASTER NETWORK NODE, WHEREIN THE RRC RECONFIGURATION MESSAGE COMPRISES INFORMATION REGARDING A PLURALITY OF CANDIDATE CELLS AND A PLURALITY OF PREDEFINED RECONFIGURATIONS, AND WHEREIN EACH CANDIDATE CELL IS ASSOCIATED WITH ONE PREDEFINED RECONFIGURATION
410

EVALUATE, BY THE PROCESSOR, A TRIGGERING CONDITION FOR AT LEAST ONE CANDIDATE CELL TO DETERMINE WHETHER TO TRIGGER A CONDITIONAL CELL CHANGE PROCEDURE
420

PERFORM, BY THE PROCESSOR, THE CONDITIONAL CELL CHANGE PROCEDURE TO SWITCH A PRIMARY SECONDARY CELL (PSCELL) ASSOCIATED WITH THE APPARATUS TO A TARGET CELL IN AN EVENT THAT THE TRIGGERING CONDITION FOR THE TARGET CELL IS MET, WHEREIN THE TARGET CELL IS ONE OF THE CANDIDATE CELLS, AND WHEREIN THE PERFORMING OF THE CONDITIONAL CELL CHANGE PROCEDURE COMPRISES:
DERIVE, BY THE PROCESSOR, A SECURITY KEY ACCORDING TO A COUNTER VALUE AND A KEY OF THE MASTER NETWORK NODE, WHEREIN THE COUNTER VALUE IS OBTAINED FROM A SEQUENCE OF DISTINCT COUNTER VALUES OF THE TARGET CELL STORED BY THE PROCESSOR OR OBTAINED FROM A SEQUENCE OF DISTINCT COUNTER VALUES OF A TARGET SECONDARY NODE (SN), OR IS GENERATED BY THE PROCESSOR
430

FIG. 4

METHOD AND APPARATUS FOR ENSURING SECURE TRANSMISSION IN MOBILE COMMUNICATIONS

CROSS REFERENCE TO RELATED PATENT APPLICATION(S)

The present disclosure is part of a non-provisional application claiming the priority benefit of U.S. Patent Application No. 63/377,553, filed 29 Sep. 2022, the content of which herein being incorporated by reference in its entirety.

TECHNICAL FIELD

The present disclosure is generally related to mobile communications and, more particularly, related to method and apparatus for ensuring secure transmission in mobile communications.

BACKGROUND

Unless otherwise indicated herein, approaches described in this section are not prior art to the claims listed below and are not admitted as prior art by inclusion in this section.

To satisfy the requirement of the increasing data rate, the fifth-generation (5G) network introduces the multi-radio dual connectivity (MR-DC). MR-DC is a generalization of the intra-Evolved Universal Terrestrial Radio Access (intra-E-UTRA) dual connectivity (DC), where a multiple Rx/Tx capable user equipment (UE) may be configured to utilize resources provided by two different nodes. Under the MR-DC architecture, the UE could use radio resources provided by different Radio Access Technology (RAT). In DC/MR-DC mode, one node acts as a master node (MN) and another one node acts as a secondary node (SN). In addition, the serving cell(s) belong to the MN is referred as a master cell group (MCG) while the serving cell(s) belong to the SN is referred as a secondary cell group (SCG).

Multi-connectivity regarding the MR-DC may involve a conditional primary secondary cell (PSCell) change procedure, in which a PSCell change procedure is executed only when the PSCell triggering condition is met. The network (e.g., the MN) configures predefined configuration or reconfiguration and triggering condition for each candidate PSCell to the UE. The UE evaluates the triggering condition, executes the PSCell change and applies the predefined configuration/reconfiguration when the triggering condition is met.

When switching the PSCell (as well as switching the SCG), secure transmission is an important issue for the newly developed wireless communication network, especially when the UE is switching back to the same PSCell/SGS. Therefore, there is a need to provide proper schemes to ensure secure transmission in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issues pertaining to secure transmission with respect to user equipment (UE) and network apparatus (e.g., a network node or a base station (BS), such as a next generation Node B (gNB)) in mobile communications.

In one aspect, a method may involve an apparatus receiving a radio resource control (RRC) reconfiguration message from a master network node, wherein the RRC reconfiguration message comprises information regarding a plurality of candidate cells and a plurality of predefined reconfigurations, and wherein each candidate cell is associated with one predefined reconfiguration. The method may also involve the apparatus evaluating a triggering condition for at least one candidate cell to determine whether to trigger a conditional cell change procedure. The method may further involve the apparatus performing the conditional cell change procedure to switch a primary secondary cell (PSCell) associated with the apparatus to a target cell in an event that the triggering condition for the target cell is met, wherein the target cell is one of the candidate cells. The method may further involve the apparatus deriving, in the performing of the conditional cell change procedure, a security key according to a counter value and a key of the master network node, wherein the counter value is obtained from a sequence of distinct counter values of the target cell stored by the processor or obtained from a sequence of distinct counter values of a target secondary node (SN) stored by the processor, or is generated by the processor, and wherein the target cell belongs to the target SN.

In one aspect, an apparatus may involve a transceiver which, during operation, wirelessly communicates with at least one network node. The apparatus may also involve a processor communicatively coupled to the transceiver such that, during operation, the processor performs following operations: receiving, via the transceiver, a RRC reconfiguration message from a master network node, wherein the RRC reconfiguration message comprises information regarding a plurality of candidate cells and a plurality of predefined reconfigurations, and wherein each candidate cell is associated with one predefined reconfiguration; evaluating a triggering condition for at least one candidate cell to determine whether to trigger a conditional cell change procedure; and performing the conditional cell change procedure to switch a PSCell associated with the apparatus to a target cell in an event that the triggering condition for the target cell is met, wherein the target cell is one of the candidate cells. In performing the conditional cell change procedure, the apparatus may also involve the processor performs following operations: deriving a security key according to a counter value and a key of the master network node, wherein the counter value is obtained from a sequence of distinct counter values of the target cell stored by the processor or obtained from a sequence of distinct counter values of a target secondary node (SN) stored by the processor, or is generated by the processor, and wherein the target cell belongs to the target SN.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 4 is a flowchart of an example process in accordance with an implementation of the present disclosure.

DETAILED DESCRIPTION OF PREFERRED IMPLEMENTATIONS

Figure 1:
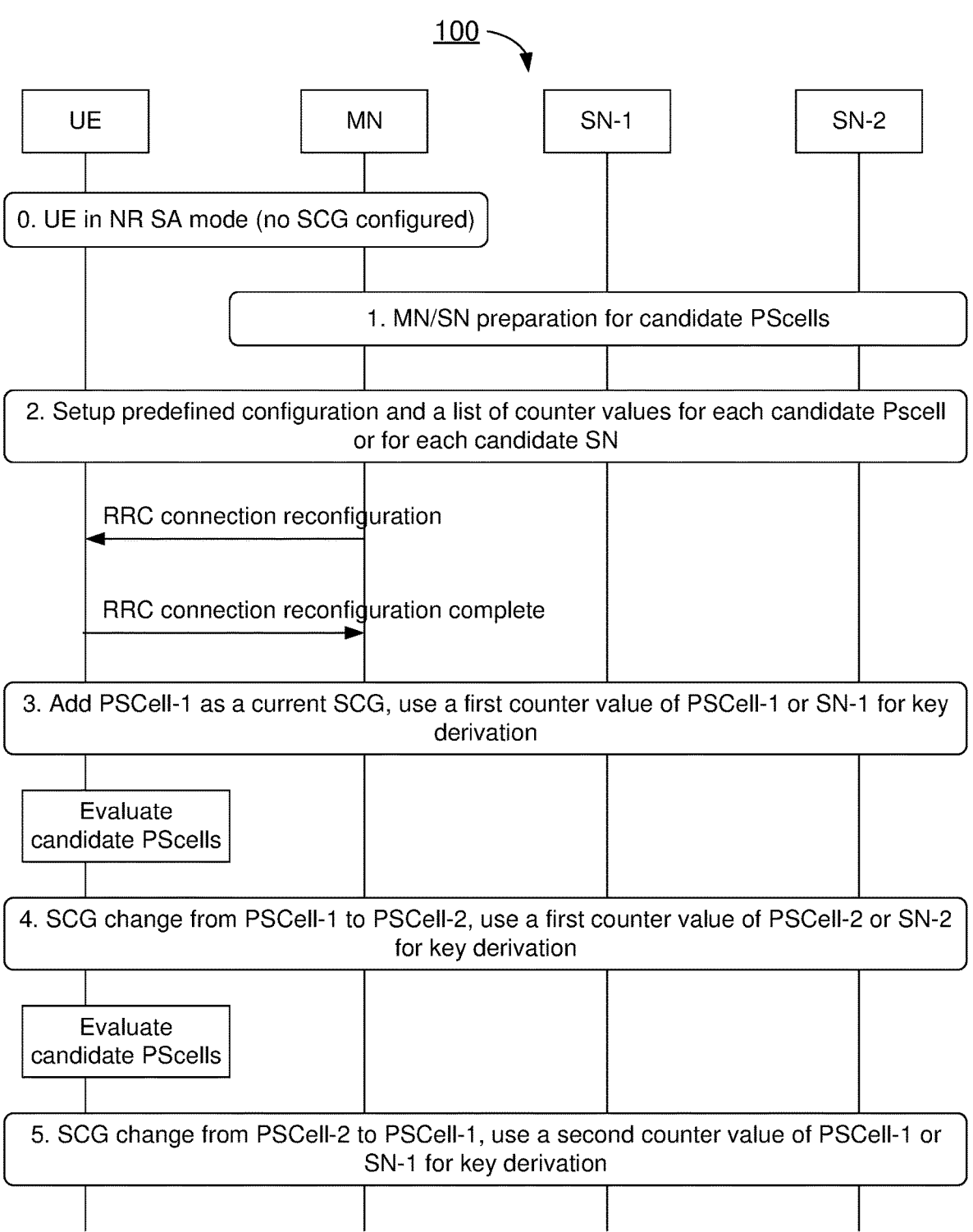
FIG. 1 is a diagram depicting an example scenario of conditional cell change procedure under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.
Overview Implementations in accordance with the present disclosure relate to various techniques, methods, schemes and/or solutions pertaining to ensure secure transmission in mobile communications. According to the present disclosure, a number of possible solutions may be implemented separately or jointly. That is, although these possible solutions may be described below separately, two or more of these possible solutions may be implemented in one combination or another.

The present disclosure proposes several schemes pertaining to security key derivation with respect to UE and network apparatus in mobile communications.

The basic flow of the conditional PSCell change (CPC) procedure may include the following operations.

The network node (e.g., a master network node or the MN) configures predefined configuration or reconfiguration (hereinafter using 'reconfiguration' for brevity) and triggering condition for each candidate PSCell.

The UE evaluates the triggering condition for each candidate PSCell.

The UE executes the PSCell change and applies the predefined reconfiguration associated with a target PSCell in an event that the triggering condition for the target PSCell is fulfilled or is met.

The UE releases all candidate PSCells and the predefined reconfigurations associated with the candidate PSCells after switching to the target PSCell.

In 3rd Generation Partnership Project (3GPP) Release-18, it is agreed to support subsequent CPC (or, subsequent conditional PSCell add or change (subsequent CPAC)) without an additional radio resource control (RRC) reconfiguration from the network (i.e., selective SCG activation), which implies that the UE will keep the candidate PSCells (and their predefined configurations/reconfigurations) instead of releasing them after the CPC.

In addition, it is also agreed to support switching back to the same SCG. As an example, the UE may perform condition PSCell addition (CPA) or CPC to switch to PSCell-1 with predefined reconfiguration associated with PSCell-1. The UE may then perform the CPC to switch to PSCell-2 with predefined reconfiguration associated with PSCell-2 in an event that the triggering condition for the PSCell-2 is fulfilled or is met. The UE may further perform the CPC to switch back to PSCell-1 with predefined reconfiguration associated with PSCell-1 in an event that the triggering condition for the PSCell-1 is fulfilled or is met, wherein the predefined reconfiguration associated with PSCell-1 may be configured and provided by the MN in the very beginning and, because of the non-released status of the PSCell-1, the MN may not provide an additional reconfiguration associated with PSCell-1 or may not update the reconfiguration associated with PSCell-1 since the previous CPC to switch to the PSCell-2 has been performed.

The predefined reconfiguration associated with a PSCell may comprise one or more security parameters, such as an sk-counter parameter or an SN counter parameter, each being utilized used as freshness input into security key derivation associated with the PSCell. However, while switching back to the same SCG or the same PSCell, some security issue may be generated due to a circumstance that the one or more security parameters previously provided in the predefined reconfiguration are not changed.

To ensure secure transmission in mobile communications, as well as to prevent key-stream reuse when the UE switches back and forth to the same PSCell or the SN, in one aspect of the present disclosure, the network node (e.g., the master network node or the MN) may provide a list or a sequence of distinct counter values, such as a list or a sequence of sk-counter values or a list or a sequence of SN counter values, for each candidate cell or for each candidate SN. The UE may derive a security key associated with the target cell or associated with the target SN from a key of the master network node and one of the counter values of the target cell or of the target SN provided by the master network node, wherein the target cell belongs to the target SN. Note that for a special case when there is only one cell per SN, the list or the sequence of distinct counter values provided by the network for one SN may be regarded as the list or the sequence of distinct counter values provided by the network for one cell.

In some implementations, the UE may receive an RRC reconfiguration message from the master network node. The RRC reconfiguration message may comprise information regarding a plurality of candidate cells and a plurality of predefined reconfigurations, and each candidate cell may be associated with one predefined reconfiguration.

In some implementations, the master network node may generate per candidate SN or per candidate cell the sequence of multiple distinct counter values during the selective SCG activation procedure.

The UE may evaluate a triggering condition for at least one candidate cell or for at least one candidate SN to determine whether to trigger a conditional cell change procedure, such as but not limited to, the subsequent CPC or the subsequent CPAC procedure. The UE may perform the conditional cell change procedure to switch the PSCell currently associated with the UE to a target cell in an event that the triggering condition for the target cell is met, wherein the target cell is one of the candidate cells, or the target SN associated with the target cell may be one of the candidate SNs.

In the performing of the conditional cell change procedure, the UE may derive a security key according to a counter value and a key of the master network node, wherein the counter value is obtained from the list or the sequence of distinct counter values of the target cell provide by the master network node and stored by the UE or is obtained from the list or the sequence of distinct counter values of the target SN provide by the master network node and stored by the UE (hereinafter selectively using either 'sequence of distinct counter values' or 'list of distinct counter values' for brevity).

In some implementations, each counter value comprised in the sequence of distinct counter values of the target SN is unique, and the obtained counter value to derive the security key is an unused counter value in the sequence of distinct counter values of the target SN.

In some implementations, the network node may provide a plurality of sequences of distinct counter values for the candidate SNs, comprising the sequence of distinct counter values of the target SN, via an RRC reconfiguration message, wherein each sequence of distinct counter values is associated with one candidate SN. The UE may store the sequences of distinct counter values for the candidate SNs. Note that in some implementations, the sequences are non-overlapping.

In some implementations, each counter value comprised in the sequence of distinct counter values of the target cell is unique, and the obtained counter value to derive the security key is an unused counter value in the sequence of distinct counter values of the target cell.

In some implementations, the network node may provide a plurality of sequences of distinct counter values for the candidate cells, comprising the sequence of distinct counter values of the target cell, via an RRC reconfiguration message, wherein each sequence of distinct counter values is associated with one candidate cell. The UE may store the sequences of distinct counter values for the candidate cells. Note that in some implementations, the sequences are non-overlapping.

In another aspect of the present disclosure, to ensure secure transmission in mobile communications, as well as to prevent key-stream reuse when the UE switches back and forth to the same PSCell or the SN, the UE may determine the counter value used in security key derivation based on a predefined rule and derive the security key associated with the target cell or derive the security key associated with the target SN from a key of the master network node and counter value locally determined by itself. The counter value currently determined by the UE is different from a former counter value used in a former security key derivation performed when previously switching to the target cell or previously switching to the target SN. As an example, an initial counter value associated with a cell or associated with an SN and used in security key derivation may be provided by the mater network node or determined by the UE. The UE may increase the counter value associated with the cell or associated with the SN by a predefined value (e.g., increase by one) after each key derivation. In some implementations, in an event that the triggering condition for a candidate PSCell is fulfilled, the UE may apply the associated predefined reconfiguration and increase the counter value by one.

In the performing of the conditional cell change procedure in said another aspect of the present disclosure, the UE may derive the security key according to the counter value locally determined by itself and a key of the master network node.

In some implementations, the security key may be the secondary key s-$K_{gNB}$ used in the SCG. The UE may derive the secondary key s-$K_{gNB}$ from a counter value (e.g., an sk-counter) (which may be obtained from the sequence of distinct counter values of the target cell or obtained from the sequence of distinct counter values of the target SN, or may be locally determined by the UE for the target cell or for the target SN) and the key (master key) $K_{gNB}$ of the MCG or the key of the master network node (e.g., the MN).

In some implementations, the security key may be the key $K_{SN}$ associated with the SN. The UE may derive the security key $K_{SN}$ from a counter value (e.g., an SN counter) (which may be obtained from the sequence of distinct counter values of the target cell or obtained from the sequence of distinct counter values of the target SN, or may be locally determined by the UE for the target cell or for the target SN) and the key (master key) $K_{gNB}$ of the MCG or the key of the master network node (e.g., the MN).

In some implementations, the UE may keep the candidate cells and the associated predefined reconfigurations after performing the conditional cell change procedure or after switching to the target cell.

In some implementations, the UE may keep the candidate cells and the associated predefined reconfigurations after performing a previous conditional cell change procedure to switch to one of the candidate cells, and the current conditional cell change procedure may be performed without an additional RRC reconfiguration associated with the target cell from the master network node, since the UE did not release the current target cell and the associated predefined reconfiguration after performing the previous conditional cell change procedure.

In some implementations, the predefined configuration associated with the target cell is not updated since the previous conditional cell change procedure to switch to another candidate cell was performed.

In some implementations, the UE may cancel a conditional cell change evaluation for the target cell in an event that an access failure of the target cell is determined to have occurred.

In some implementations, the UE may cancel a conditional cell change evaluation for a candidate cell or for a target SN in an event that all counter values in the sequence of distinct counter values of the candidate cell are already used or all counter values in the sequence of distinct counter values of the candidate SN are already used, or in an event that the UE may not be unable to locally generate a valid counter value for the candidate cell.

FIG. 1 illustrates an example an example scenario 100 of conditional cell change procedure under schemes in accordance with implementations of the present disclosure. In phase 0, the UE may operate in an NR standalone (SA) mode with no SCG configured. In phase 1, the master network node (e.g., a MN) and/or the secondary network nodes (e.g., secondary nodes SN-1, SN-2 . . . etc.) may perform preparation for candidate PSCells to be configured to the UE. In phase 2, the MN may set up a predefined configuration (or reconfiguration) and a list of counter values (i.e., aforementioned sequence of distinct counter values) for each candidate PSCell or for each candidate SN. The MN may transmit information regarding the candidate cells and the predefined configurations (or reconfigurations) of the candidate cells to the UE via the RRC connection reconfiguration message. Note that in an alternative implementation, the MN does not provide a list of counter values for each candidate PSCell or for each candidate SN to the UE, or only provides an initial counter value associated with each candidate PSCell or each candidate SN for determining the subsequent counter values to the UE. Upon receiving the RRC connection reconfiguration message, the UE may reply the RRC connection reconfiguration complete message to the MN.

In phase 3, the UE may add the PSCell PSCell-1 of the SN-1, and use a first counter value (e.g., counter_1) in the list of counter values of the PSCell-1 (or, a first counter value in the list of counter values of the SN-1) for key derivation. When the UE adds the PSCell-1, the UE may perform a random access procedure toward the PSCell-1 (or toward the corresponding SCG). Note that in an alternative implementation, instead of being pre-provisioned by the MN, the first counter value may also be determined by the UE when changing to the PSCell-1 for the first time based on the initial counter value corresponding to the PSCell-1 (or, the initial counter value corresponding to the SN-1) and a predefined rule, and the UE may use the first counter value of the PSCell-1 or of the SN-1 determined by itself for key derivation. The UE may keep evaluating one or more candidate PSCells and determine whether to trigger a conditional cell change procedure.

In phase 4, in an event that the triggering condition for the PSCell PSCell-2 of the SN-2 is met, the UE may perform SCG change to change from PSCell-1 to PSCell-2, and use a first counter value in the list of counter values of the PSCell-2 (or, a first counter value in the list of counter values of the SN-2) for key derivation. When the UE changes to PSCell-2, the UE may perform a random access procedure toward the PSCell-2 (or toward the corresponding SCG). Note that in an alternative implementation, instead of being pre-provisioned by the MN, the first counter value may also be determined by the UE when changing to the PSCell-2 for the first time based on the initial counter value corresponding to the PSCell-2 (or, the initial counter value corresponding to the SN-2) and the same predefined rule or a different rule, and the UE may use the first counter value of the PSCell-2 or of the SN-2 determined by itself for key derivation. The UE may keep evaluating one or more candidate PSCells and determine whether to trigger a conditional cell change procedure.

In phase 5, in an event that the triggering condition for the PSCell-1 of the SN-1 is met, the UE may perform SCG change to change from PSCell-2 to PSCell-1, and use a second counter value (e.g., counter_2) in the list of counter values of the PSCell-1 (or, a second counter value in the list of counter values of the SN-1) for key derivation. When the UE changes to PSCell-1, the UE may perform a random access procedure toward the PSCell-1 (or toward the corresponding SCG). Note that in an alternative implementation, instead of being pre-provisioned by the MN, the second counter value may also be determined by the UE when changing to the PSCell-1 for the second time based on the predefined rule, and the UE may use the second counter value of the PSCell-1 or of the SN-1 determined by itself for key derivation. Note further that in some implementations, the counter values determined at different times of changing or switching to a PSCell are different. That is, the counter value determined by the UE for each time of changing or switching to the same PSCell or for each SCG activation associated to the same PSCell is unique.

Figure 2:
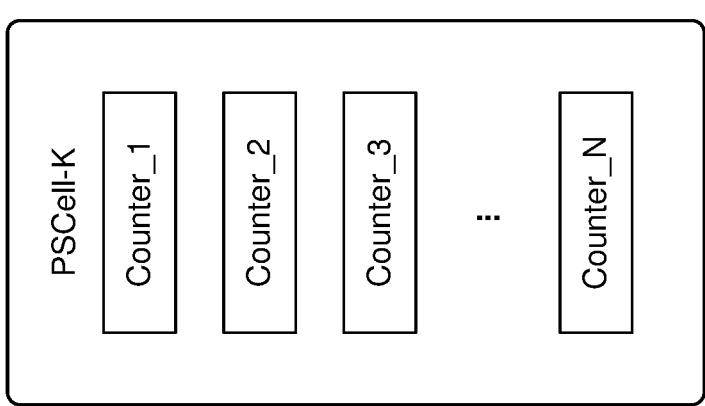
FIG. 2 is a diagram depicting an example scenario of multiple sequences of distinct counter values for the configured candidate cells under schemes in accordance with implementations of the present disclosure.
Figure 2:
Figure 2:
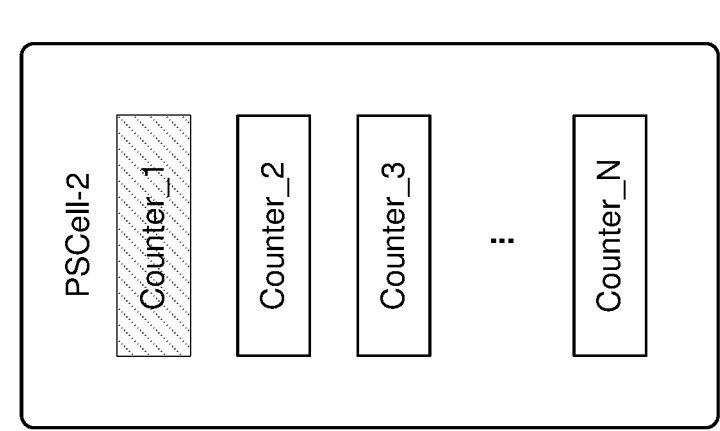
Figure 2:
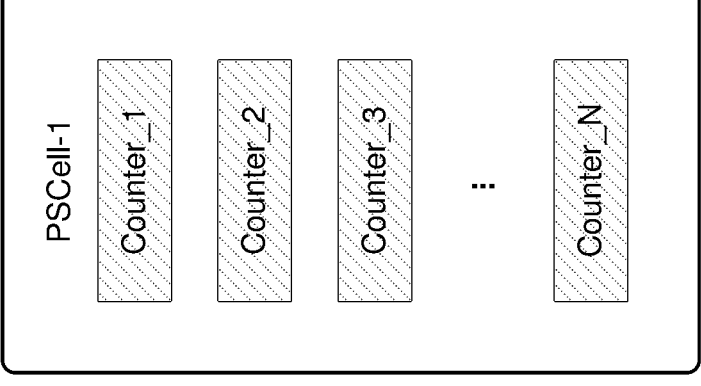

FIG. 2 illustrates an example an example scenario 200 of multiple sequences of distinct counter values for the configured candidate cells under schemes in accordance with implementations of the present disclosure. It is assumed that PSCells PSCell-1, PSCell-2 . . . PSCell-K are configured to the UE. The master network node may transmit information regarding the candidate cells PSCell-1, PSCell-2 . . . PSCell-K and the predefined configurations (or reconfigurations) of the candidate cells PSCell-1, PSCell-2 . . . PSCell-K, comprising a sequence of distinct counter values for each corresponding candidate PSCell, to the UE via the RRC connection reconfiguration message.

The UE stores these values (e.g., counter values Counter_1, Counter_2, Counter_3 . . . Counter_N for each candidate PSCell) along with the CPC. In some implementations, the UE may derive a security key of a corresponding PSCell based on a key of the master network node and the Nth provided counter value (e.g., the counter value Counter_N) of the corresponding PSCell for the Nth time activating the SCG.

In some implementations, the security key may be the secondary key s-$K_{gNB}$ used in the SCG and the UE may change the counter value upon every PSCell or SCG change.

In some implementations, the security key may be the key $K_{SN}$ associated with the SN and the UE may change the counter value upon every SN change.

In some implementations, the UE may not trigger or may cancel a conditional cell change evaluation (e.g., not trigger a CPC to a candidate SCG or stop CPC evaluation) for a candidate cell in an event that all counter values in the sequence of distinct counter values of the corresponding PSCell are already used, such as condition of the candidate cell PSCell-1 as shown in FIG. 2, where the counter values covered by slashes are the used counter values and the counter values uncovered by slashes in FIG. 2 are the unused counter values. In some implementations, in an event that all counter values in the sequence of distinct counter values of a PSCell are already used, the master network node may update the counter values via RRC reconfiguration.

In some implementations, the UE may stop or cancel a conditional cell change evaluation for a candidate cell in an event that an access failure of the candidate cell or in an event that SCG failure is determined to have occurred, to avoid key unsynchronous.

Note that in some implementations, the master network node may also transmit information regarding the candidate secondary nodes (SNs) SN-1, SN-2 . . . SN-K and the predefined configurations (or reconfigurations) of the candidate SNs or candidate cells associated with the SNs, comprising a sequence of distinct counter values for each corresponding candidate SN, to the UE via the RRC connection reconfiguration message. The UE stores these values for each candidate SN along with the CPC. Therefore, the cells PSCell-1, PSCell-2 . . . PSCell-K labeled in FIG. 2 may also be replaced by multiple SNs SN-1, SN-2 . . . SN-K in such implementations. The UE may derive a security key of a corresponding PSCell or of a corresponding SN based on a key of the master network node and the Nth provided counter value of the corresponding SN for the Nth time activating the SCG.

In some implementations, after the CPC is configured, the network (e.g., the master network node) may still update the RRC Configuration (without changing the PSCell). The UE may apply the CPC RRC reconfiguration against on latest current configuration. It is the network's responsibility to ensure a combination of the latest configuration and the CPC configuration is a valid configuration.

Illustrative Implementations

Figure 3:
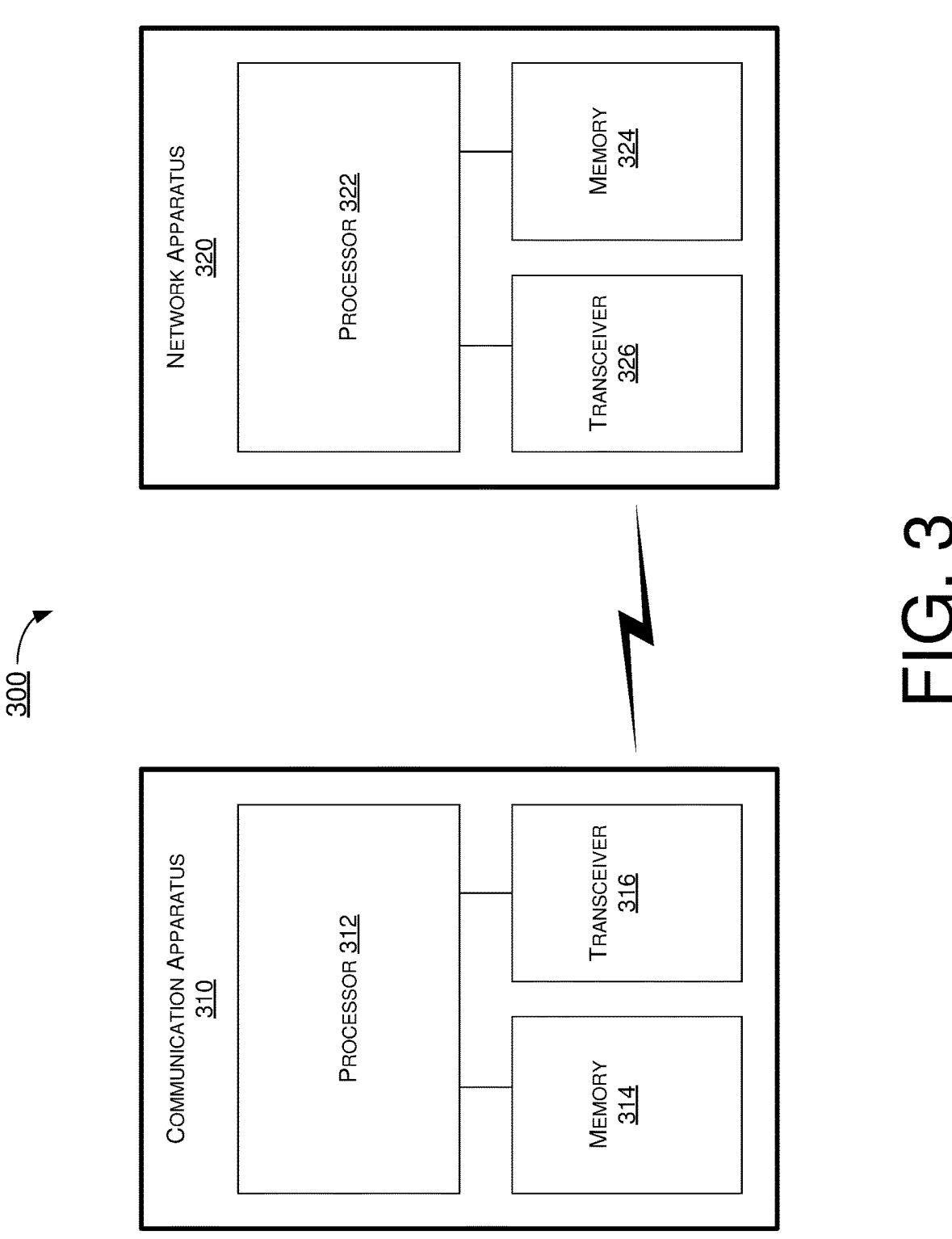
FIG. 3 is a block diagram of an example communication system in accordance with an implementation of the present disclosure.

FIG. 3 illustrates an example communication system 300 having an example communication apparatus 310 and an example network apparatus 320 in accordance with an implementation of the present disclosure. Each of the communication apparatus 310 and the network apparatus 320 may perform various functions to implement schemes, techniques, processes and methods described herein pertaining to network power saving with respect to user equipment and network apparatus in mobile communications, including scenarios/schemes described above as well as process 400 described below.

The communication apparatus 310 may be a part of an electronic apparatus, which may be a UE such as a portable or mobile apparatus, a wearable apparatus, a wireless communication apparatus or a computing apparatus. For instance, the communication apparatus 310 may be implemented in a smartphone, a smartwatch, a personal digital assistant, a digital camera, or a computing equipment such as a tablet computer, a laptop computer or a notebook computer. The communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, the communication apparatus 310 may be implemented in a smart thermostat, a smart fridge, a smart door lock, a wireless speaker or a home control center. Alternatively, the communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. The communication apparatus 310 may include at least some of those components shown in FIG. 3 such as a processor 312, for example. The communication apparatus 310 may further include one or more other components not pertinent to the proposed scheme of the present disclosure (e.g., internal power supply, display device and/or user interface device), and, thus, such component(s) of the communication apparatus 310 are neither shown in FIG. 3 nor described below in the interest of simplicity and brevity.

The network apparatus 320 may be a part of a network apparatus, which may be a network node such as a master network node or a master node, a secondary network node or a secondary node, a satellite, a base station, a small cell, a router or a gateway. For instance, the network apparatus 320 may be implemented in an eNodeB in an LTE network, in a gNB in a 5G/NR, IoT, NB-IoT or IIoT network or in a satellite or base station in a 6G network. Alternatively, the network apparatus 320 may be implemented in the form of one or more IC chips such as, for example and without limitation, one or more single-core processors, one or more multi-core processors, or one or more RISC or CISC processors. The network apparatus 320 may include at least some of those components shown in FIG. 3 such as a processor 322, for example. The network apparatus 320 may further include one or more other components not pertinent to the proposed scheme of the present disclosure (e.g., internal power supply, display device and/or user interface device), and, thus, such component(s) of the network apparatus 320 are neither shown in FIG. 3 nor described below in the interest of simplicity and brevity.

In one aspect, each of the processor 312 and the processor 322 may be implemented in the form of one or more single-core processors, one or more multi-core processors, or one or more CISC processors. That is, even though a singular term "a processor" is used herein to refer to the processor 312 and the processor 322, each of the processor 312 and the processor 322 may include multiple processors in some implementations and a single processor in other implementations in accordance with the present disclosure. In another aspect, each of the processor 312 and the processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of the processor 312 and the processor 322 is a special-purpose machine specifically designed, arranged and configured to perform specific tasks including autonomous reliability enhancements in a device (e.g., as represented by the communication apparatus 310) and a network (e.g., as represented by the network apparatus 320) in accordance with various implementations of the present disclosure.

In some implementations, the communication apparatus 310 may also include a transceiver 316 coupled to the processor 312 and capable of wirelessly transmitting and receiving data. In some implementations, the communication apparatus 310 may further include a memory 314 coupled to the processor 312 and capable of being accessed by the processor 312 and storing data therein. In some implementations, the network apparatus 320 may also include a transceiver 326 coupled to the processor 322 and capable of wirelessly transmitting and receiving data. In some implementations, the network apparatus 320 may further include a memory 324 coupled to the processor 322 and capable of being accessed by the processor 322 and storing data therein. Accordingly, the communication apparatus 310 and the network apparatus 320 may wirelessly communicate with each other via the transceiver 316 and the transceiver 326, respectively. To aid better understanding, the following description of the operations, functionalities and capabilities of each of the communication apparatus 310 and the network apparatus 320 is provided in the context of a mobile communication environment in which the communication apparatus 310 is implemented in or as a communication apparatus or a UE and the network apparatus 320 is implemented in or as a network node of a communication network.

In some implementations, the processor 312, which is communicatively coupled to the transceiver 316, may receive, via the transceiver 316, an RRC reconfiguration message from a master network node (e.g., as represented by the network apparatus 320), wherein the RRC reconfiguration message comprises information regarding a plurality of candidate cells and a plurality of predefined reconfigurations, and wherein each candidate cell is associated with one predefined reconfiguration. The processor 312 may evaluate a triggering condition for at least one candidate cell to determine whether to trigger a conditional cell change procedure. The processor 312 may perform the conditional cell change procedure to switch a PSCell associated with the communication apparatus 310 to a target cell in an event that the triggering condition for the target cell is met, wherein the target cell is one of the candidate cells.

In some implementations, in performing the conditional cell change procedure, the processor 312 may derive a security key according to a counter value and a key of the network apparatus 320. The counter value is obtained from a sequence of distinct counter values of the target cell stored by the processor 312 or obtained from a sequence of distinct counter values of a target SN stored by the processor 312, or is generated by the processor 312. The target cell may belong to the target SN.

In some implementations, the processor 312 may keep the candidate cells and the associated predefined reconfigurations after switching to the target cell.

In some implementations, the conditional cell change procedure may be performed without an additional RRC reconfiguration associated with the target cell from the network apparatus 320.

In some implementations, the predefined configuration associated with the target cell may be not updated since a previous conditional cell change procedure to switch to another candidate cell was performed.

In some implementations, each counter value comprised in the sequence of distinct counter values of the target SN is unique, and wherein the counter value to derive the security key is an unused counter value in the sequence of distinct counter values of the target SN.

In some implementations, each counter value comprised in the sequence of distinct counter values of the target cell is unique, and the counter value to derive the security key is an unused counter value in the sequence of distinct counter values of the target cell.

In some implementations, the processor 312 may store a plurality of sequences of distinct counter values comprising the sequence of distinct counter values of the target SN. The sequences of distinct counter values are configured by the network apparatus 320 via the RRC reconfiguration message, and each sequence of distinct counter values is associated with one candidate SN.

In some implementations, the processor 312 may store a plurality of sequences of distinct counter values comprising the sequence of distinct counter values of the target cell. The sequences of distinct counter values are configured by the network apparatus 320 via the RRC reconfiguration message, and each sequence of distinct counter values is associated with one candidate cell.

In some implementations, the processor 312 may determine the counter value based on a predefined rule, wherein the counter value is different from a former counter value used in a former security key derivation performed when previously switching to the target cell.

In some implementations, the processor 312 may cancel a conditional cell change evaluation for the target cell in an event that an access failure of the target cell is determined to have occurred.

In some implementations, the processor 312 may cancel a conditional cell change evaluation for a candidate cell in an event that all counter values in the sequence of distinct counter values of the candidate cell are already used.

Illustrative Processes

FIG. 4 illustrates an example process 400 in accordance with an implementation of the present disclosure. The process 400 may be an example implementation of the above scenarios/schemes, whether partially or completely, with respect to security key derivation with the present disclosure. The process 400 may represent an aspect of implementation of features of communication apparatus 310. The process 400 may include one or more operations, actions, or functions as illustrated by one or more of blocks 410, 420 and 430. Although illustrated as discrete blocks, various blocks of the process 400 may be divided into additional blocks, combined into fewer blocks, or eliminated, depending on the desired implementation. Moreover, the blocks of the process 400 may be executed in the order shown in FIG. 4 or, alternatively, in a different order. The process 400 may be implemented by the communication apparatus 310 or any suitable UE or machine type devices. Solely for illustrative purposes and without limitation, the process 400 is described below in the context of the communication apparatus 310. The process 400 may begin at block 410.

At 410, the process 400 may involve the processor 312 of the communication apparatus 310 receiving an RRC reconfiguration message from a master network node, wherein the RRC reconfiguration message comprises information regarding a plurality of candidate cells and a plurality of predefined reconfigurations, and wherein each candidate cell is associated with one predefined reconfiguration. The process 400 may proceed from 410 to 420.

At 420, the process 400 may involve the processor 312 evaluating a triggering condition for at least one candidate cell to determine whether to trigger a conditional cell change procedure. The process 400 may proceed from 420 to 430.

At 430, the process 400 may involve the processor 312 performing the conditional cell change procedure to switch a PSCell associated with the communication apparatus 310 to a target cell in an event that the triggering condition for the target cell is met. The target cell is one of the candidate cells. The process 400 may further involve the processor 312, in the performing of the conditional cell change procedure, deriving a security key according to a counter value and a key of the master network node, wherein the counter value is obtained from a sequence of distinct counter values of the target cell stored by the processor 312 or obtained from a sequence of distinct counter values of a target SN stored by the processor 312, or is generated by the processor 312. The target cell my belong to the target SN.

In some implementations, the process 400 may involve processor 312 keeping the candidate cells and the associated predefined reconfigurations after switching to the target cell.

In some implementations, the process 400 may involve the conditional cell change procedure being performed without an additional RRC reconfiguration associated with the target cell from the master network node.

In some implementations, the process 400 may involve the predefined configuration associated with the target cell not being updated since a previous conditional cell change procedure to switch to another candidate cell was performed.

In some implementations, the process 400 may involve each counter value comprised in the sequence of distinct counter values of the target SN being unique, and the counter value to derive the security key being an unused counter value in the sequence of distinct counter values of the target SN.

In some implementations, the process 400 may involve each counter value comprised in the sequence of distinct counter values of the target cell being unique, and the counter value to derive the security key being an unused counter value in the sequence of distinct counter values of the target cell.

In some implementations, the process 400 may involve processor 312 storing a plurality of sequences of distinct counter values comprising the sequence of distinct counter values of the target SN, wherein the sequences of distinct counter values are configured by the master network node via the RRC reconfiguration message, and wherein each sequence of distinct counter values is associated with one candidate SN.

In some implementations, the process 400 may involve processor 312 storing a plurality of sequences of distinct counter values comprising the sequence of distinct counter values of the target cell, wherein the sequences of distinct counter values are configured by the master network node via the RRC reconfiguration message, and wherein each sequence of distinct counter values is associated with one candidate cell.

In some implementations, the process 400 may involve processor 312 determining the counter value based on a predefined rule, wherein the counter value is different from a former counter value used in a former security key derivation performed when previously switching to the target cell.

In some implementations, the process 400 may involve processor 312 cancelling a conditional cell change evaluation for the target cell in an event that an access failure of the target cell is determined to have occurred.

In some implementations, the process 400 may involve processor 312 cancelling a conditional cell change evaluation for a candidate cell in an event that all counter values in the sequence of distinct counter values of the candidate cell are already used.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of an apparatus, a radio resource control (RRC) reconfiguration message from a master network node, wherein the RRC reconfiguration message comprises information regarding a plurality of candidate cells and a plurality of predefined reconfigurations, and wherein each candidate cell is associated with one predefined reconfiguration;

evaluating, by the processor, a triggering condition for at least one candidate cell to determine whether to trigger a conditional cell change procedure; and performing, by the processor, the conditional cell change procedure to switch a primary secondary cell (PSCell) associated with the apparatus to a target cell in an event that the triggering condition for the target cell is met, wherein the target cell is one of the candidate cells, and wherein the performing of the conditional cell change procedure comprises:

deriving, by the processor, a security key according to a counter value and a key of the master network node, wherein the counter value is obtained from a sequence of distinct counter values of the target cell stored by the processor or obtained from a sequence of distinct counter values of a target secondary node (SN) stored by the processor, or is generated by the processor, and wherein the target cell belongs to the target SN, wherein the method further comprises:

storing, by the processor, a plurality of sequences of distinct counter values comprising the sequence of distinct counter values of the target SN or the target cell, wherein the sequences of distinct counter values are configured by the master network node via the RRC reconfiguration message, and wherein each sequence of distinct counter values is associated with one candidate SN or one candidate cell.

2. The method of claim 1, further comprising:

keeping, by the processor, the candidate cells and the associated predefined reconfigurations after switching to the target cell.

3. The method of claim 1, wherein the predefined configuration associated with the target cell is not updated since a previous conditional cell change procedure.

4. The method of claim 1, wherein each counter value comprised in the sequence of distinct counter values of the target SN is unique, and wherein the counter value to derive the security key is an unused counter value in the sequence of distinct counter values of the target SN.

5. The method of claim 1, wherein each counter value comprised in the sequence of distinct counter values of the target cell is unique, and wherein the counter value to derive the security key is an unused counter value in the sequence of distinct counter values of the target cell.

6. The method of claim 1, further comprising:

determining, by the processor, the counter value based on a predefined rule, wherein the counter value is different from a former counter value used in a former security key derivation.

7. The method of claim 1, further comprising:

cancelling, by the processor, a conditional cell change evaluation for the target cell in an event that an access failure of the target cell is determined.

8. The method of claim 1, further comprising:

cancelling, by the processor, a conditional cell change evaluation for a candidate cell in an event that all counter values in the sequence of distinct counter values of the candidate cell are already used.

9. An apparatus, comprising:

a transceiver which, during operation, wirelessly communicates with at least one network node; and a processor communicatively coupled to the transceiver such that, during operation, the processor performs operations comprising:

receiving, via the transceiver, a radio resource control (RRC) reconfiguration message from a master network node, wherein the RRC reconfiguration message comprises information regarding a plurality of candidate cells and a plurality of predefined reconfigurations, and wherein each candidate cell is associated with one predefined reconfiguration;

evaluating a triggering condition for at least one candidate cell to determine whether to trigger a conditional cell change procedure; and performing the conditional cell change procedure to switch a primary secondary cell (PSCell) associated with the apparatus to a target cell in an event that the triggering condition for the target cell is met, wherein the target cell is one of the candidate cells, and wherein, in performing the conditional cell change procedure, the processor further performs operation comprising:

deriving a security key according to a counter value and a key of the master network node, wherein the counter value is obtained from a sequence of distinct counter values of the target cell stored by the processor or obtained from a sequence of distinct counter values of a target secondary node (SN) stored by the processor, or is generated by the processor, and wherein the target cell belongs to the target SN, wherein, during operation, the processor further performs operations comprising:

storing a plurality of sequences of distinct counter values comprising the sequence of distinct counter values of the target SN or the target cell, wherein the sequences of distinct counter values are configured by the master network node via the RAC reconfiguration message, and wherein each sequence of distinct counter values is associated with one candidate SN or one candidate cell.

10. The apparatus of claim 9, wherein, during operation, the processor further performs operation comprising:

keeping the candidate cells and the associated predefined reconfigurations after switching to the target cell.

11. The apparatus of claim 9, wherein the predefined configuration associated with the target cell is not updated since a previous conditional cell change procedure.

12. The apparatus of claim 9, wherein each counter value comprised in the sequence of distinct counter values of the target SN is unique, and wherein the counter value to derive the security key is an unused counter value in the sequence of distinct counter values of the target SN.

13. The apparatus of claim 9, wherein each counter value comprised in the sequence of distinct counter values of the target cell is unique, and wherein the counter value to derive the security key is an unused counter value in the sequence of distinct counter values of the target cell.

14. The apparatus of claim 9, wherein, during operation, the processor further performs operation comprising:

determining the counter value based on a predefined rule, wherein the counter value is different from a former counter value used in a former security key derivation.

15. The apparatus of claim 9, wherein, during operation, the processor further performs operation comprising:

cancelling a conditional cell change evaluation for the target cell in an event that an access failure of the target cell is determined.

16. The apparatus of claim 9, wherein, during operation, the processor further performs operation comprising:

cancelling a conditional cell change evaluation for a candidate cell in an event that all counter values in the sequence of distinct counter values of the candidate cell are already used.

\* \* \* \* \*